United States Patent
Kern et al.

(10) Patent No.: US 8,424,186 B2
(45) Date of Patent: Apr. 23, 2013

(54) METHOD FOR MANUFACTURING AN ELECTRIC MACHINE BY A LOST FOAM CASTING PROCESS, AND ELECTRIC MACHINE FOR A HYBRID VEHICLE

(75) Inventors: Denis Kern, Stuttgart-Ost (DE); Andreas Herzberger, Welzheim (DE)

(73) Assignee: Robert Bosch GmbH, Stuttgart (DE)

( * ) Notice: Subject to any disclaimer, the term of this patent is extended or adjusted under 35 U.S.C. 154(b) by 361 days.

(21) Appl. No.: 12/452,766

(22) PCT Filed: Jun. 10, 2009

(86) PCT No.: PCT/EP2009/057135
§ 371 (c)(1),
(2), (4) Date: Mar. 26, 2010

(87) PCT Pub. No.: WO2010/012537
PCT Pub. Date: Feb. 4, 2010

(65) Prior Publication Data
US 2010/0181873 A1    Jul. 22, 2010

(30) Foreign Application Priority Data
Jul. 30, 2008   (DE) .................. 10 2008 040 873

(51) Int. Cl.
*H02K 15/00* (2006.01)
(52) U.S. Cl.
USPC ............................................. 29/596; 164/34
(58) Field of Classification Search ............ 29/596–598, 29/732; 164/34–35, 45, 235, 246, 249, 6; 310/418, 89, 64, 53
See application file for complete search history.

(56) References Cited

U.S. PATENT DOCUMENTS

| | | | | |
|---|---|---|---|---|
| 4,987,945 A | * | 1/1991 | Corbett | 164/235 |
| 5,630,461 A | * | 5/1997 | CoChimin | 164/34 |
| 5,798,910 A | * | 8/1998 | Holbeche et al. | 361/809 |
| 6,109,333 A | | 8/2000 | Pontzer | |
| 2010/0181873 A1 | * | 7/2010 | Kern et al. | 310/418 |

FOREIGN PATENT DOCUMENTS

| | | |
|---|---|---|
| CN | 1383253 | 12/2002 |
| DE | 1 765 059 | 4/1958 |
| DE | 693 18 449 | 1/1999 |
| DE | 10 2007 014 352 | 10/2008 |
| EP | 0 874 444 | 10/1998 |
| EP | 1 041 699 | 10/2000 |
| JP | 2000-102217 | 4/2000 |
| WO | WO 92/17932 | 10/1992 |
| WO | WO 2005/107046 | 11/2005 |

* cited by examiner

*Primary Examiner* — Minh Trinh
(74) *Attorney, Agent, or Firm* — Kenyon & Kenyon LLP

(57) ABSTRACT

A method for manufacturing an electric machine, made up of a housing, a stator accommodated in the housing, which is formed from a stator body and stator windings, a rotor, which is supported in the housing so as to be rotatable about a rotor axis, and a bearing support fastened on the housing, includes a housing foam part manufactured from at least three individual foam parts and a housing cast blank manufactured using the housing foam part in accordance with a lost foam casting method. Individual foam parts are made up of a center disk having an essentially hollow-cylindrical design and forming an intermediate piece of a housing foam part, an annular disk having an essentially hollow-cylindrical design and forming another intermediate piece of the housing foam part, and a bearing support disk having an essentially cup-shaped design and forming an end of the housing foam part.

6 Claims, 8 Drawing Sheets

METHOD FOR MANUFACTURING AN ELECTRIC MACHINE BY A LOST FOAM CASTING PROCESS, AND ELECTRIC MACHINE FOR A HYBRID VEHICLE

FIELD OF THE INVENTION

The present invention relates to a method for manufacturing an electric machine and to an electric machine.

BACKGROUND INFORMATION

In current designs of electric machines, the housing predominantly has a multipart construction. In particular, two designs are used in this connection. First, there is a three-part design of the housing as in DE 1 765 059 U, and second, there is a two-part design as in EP 1 041 699 B1.

The three-part design is made up of a central cylindrical body, in which the stator of the electric machine is accommodated, and two bearing supports, which terminate the housing on both sides. The bearing supports accommodate a floating bearing or a fixed bearing. A disadvantage in this construction is a long tolerance chain between the two bearings, which results in a widening of the functional air gap between the rotor and the stator, or requires a very narrow tolerance field for manufacturing the three individual housing parts.

Two-part housings allow for a manufacture at a wider tolerance field while maintaining a constant air gap, but are limiting with respect to flexibility and the fulfillment of varying requirements because the housings must be adapted almost entirely; for example in the event of modifications of possible predefined interfaces such as coolant or high-voltage terminals. This is also the case in three-part housings.

Casting methods such as the lost-foam casting method described in DE 693 18 449 T2 are generally used for manufacturing electric machines and specifically for manufacturing the housings of electric machines.

An objective of the exemplary embodiments and/or exemplary methods of the present invention is to design the construction of a housing of an electrical machine manufactured in the lost-foam casting method in such a way that a maximum flexibility may be achieved with respect to the different specified interfaces using a single housing variant.

SUMMARY OF THE INVENTION

The method according to the present invention for manufacturing an electric machine and the electric machine manufactured according to the method of the present invention allow for the achievement of a maximum flexibility of the housing with respect to specified interfaces.

The method of the present invention for manufacturing the electric machine having the features described herein provides for a housing of the electric machine to be manufactured in the following method steps. The manufacture of a housing foam part from at least three individual foam parts, the use of at least three individual foam parts offering the possibility of manufacturing the housing foam part according to a modular design principle, which keeps the number of necessary tools for manufacturing the foam parts low and saves costs in the manufacture. The more variants there are of the final product, the more costs may be saved if the same tools may be used for several variants. Manufacturing the housing foam part in individual foam parts offers the advantage of manufacturing it in a disk construction, for example made up of a center disk, an annular disk and a bearing support disk. In contrast to manufacturing the housing foam part from a single tall tool, the individual foam parts are manufactured in shallower tools, whereby the casting method is optimized and thereby also made more cost-effective.

Another method step for manufacturing the housing of the electric machine is the manufacture of a housing cast blank using the housing foam part according to a lost-foam casting method. The lost-foam casting method offers innovative possibilities of component design in that individual foam parts are joined to form a single housing foam part. In addition, the casting method also offers a high modification flexibility with respect to the individual foam parts, which is advantageous for the diversity of variants of the housing.

In one embodiment of the method, the housing foam part is formed from the individual foam parts and the individual foam parts are connected to one another by a bonding method coaxially with respect to the rotor axis. In the process, base geometries of cooling channels are formed in at least one individual foam part such that the formed base geometries of the cooling channels in the housing foam part form a continuous base geometry of a cooling channel of the housing and the individual foam parts are joined to one another in such a way that the base geometries of the cooling channels formed in the individual foam parts form in the housing foam part a continuous base geometry of the cooling channel of the housing. Bonding the individual foam parts to one another has the advantage that the foam parts maintain their shape when handled.

Another advantage is the flexibility with respect to the design and the axial extension of the cooling channel. Depending on the length of the electric machine and the installed stator, the cooling channel may be developed exclusively in the center disk. If due to the layout of the electric machine a greater axial extension of the cooling channel is required, then the latter may extend beyond the center disk into the annular disk and/or into the bearing support disk. The cooling channel is already molded into the housing, whereby sealing surfaces and additional components for forming a cooling channel may be saved, which reduces costs and avoids possible sources of error, which could result in a failure of the electric machine.

In another embodiment of the present invention, the housing foam part is modifiable in its extension in the axial direction in that the individual foam part of the annular disk is modified in its axial extension and/or the individual foam part of the bearing support disk is modified in its axial extension. By leaving the individual foam part of the center disk at a constant length for example, and only modifying the individual foam parts of the annular disk and the bearing support disk, costs for manufacturing tools may be saved. Depending on the construction and requirements of the electric machine, the housing length may be adapted flexibly without having to modify the tool for manufacturing the individual foam part of the center disk.

In another development of the present invention, the individual foam part of the annular disk is formed from a first and a second annular foam part. The two annular foam parts are joined coaxially to the rotor axis, both being advantageously rotatably alignable to each other in a plurality of angular positions with respect to the rotor axis. The two-part design makes it possible to develop a cooling channel in the first annular foam part, which in a predefined way forms a base geometry of a cooling channel or a part of a base geometry of a cooling channel after bonding to the individual foam part of the center disk. The second annular foam part, which represents an interface to other components such as a bearing support for example, is connected in such a way to the first annular foam part that specified requirements are fulfilled.

The flexible alignment of the two annular foam parts in nearly any angular position allows for the fulfillment of a multitude of requirements regarding existing connections such as the correct positioning of a connection for a high-voltage terminal for example.

Another development provides for the individual foam part of the annular disk to be formed from one individual foam part and for the individual foam part to be manufactured by a tool from two annular foam mold halves. The annular foam mold halves are joined coaxially with respect to the rotor axis and closed, which yields an overall cavity for the individual foam part of the annular disk. The annular foam mold halves are furthermore rotatably alignable relative to each other with respect to the rotor axis in a multitude of angular positions. Given an appropriate tool design, nearly any angular position is possible. Advantages of this embodiment result analogously to the advantages of the embodiment having to annular foam parts.

In another embodiment of the present invention, the position of the first and second annular foam parts relative to each other is specified by the arrangement of coolant connectors disposed on the housing and a connection disposed on the bearing support. The same applies to the positions of the first and second annular foam mold halves relative to each other. In this embodiment, the coolant connectors and the connection disposed on the bearing support are advantageously alignable in such a way that flexible reactions are possible in the case of different requirements and that existing connectors and interfaces may be retained.

In one development of the exemplary embodiments and/or exemplary methods of the present invention, the housing cast blank is machined on the inside so as to form a stop against which the stator body abuts after the stator has been installed in the housing. An advantage of this development is the variable positioning of the stop and thus the variable positioning of the stator. The position of the stop is advantageously chosen in such a way that the installed stator is entirely covered by the cooling channel integrated in the housing.

In one specific embodiment of the present invention, which is produced according to the method of the present invention, the one-part housing manufactured by one casting may be subdivided into a bearing support part, a center part, and an annular part, analogous to the housing foam part described above. At its end face, the bearing support part has projections for fastening the housing on at least one existing component and it has a bearing receptacle on the end face radially in the direction of the rotor axis. The center part has coolant connectors on the outer circumference, and the annular part has projections distributed over the outer circumference, to which the bearing support may be attached.

An advantage in this specific embodiment are the projections formed in one piece on the bearing support part and on the annular part because existing components and the bearing support may be fastened directly on the housing. This occurs for example via screw connections. The bearing receptacle formed in one piece on the bearing support part, which is machined prior to receiving the bearing, allows for a more precise support of the rotor than if the support were provided by two mounted bearing supports on the housing. Another advantage are the coolant connectors situated on the outer circumference of the center part, which ensure an optimal coolant supply and thus cooling of the electric machine because of their central position on the housing.

In another specific embodiment of the electric machine, the connection situated on the bearing support is a high-voltage terminal. The high-voltage terminal is advantageously disposed on the bearing support such that it is not necessary to adapt parts of the housing if the high-voltage terminal requirements change.

The described electric machine may be used in hybrid-driven vehicles.

Further advantages and advantageous developments derive from the description and the subsequent drawing.

Exemplary embodiments of the present invention are depicted in the drawings and explained in greater detail in the description below.

DETAILED DESCRIPTION

Figure 1:
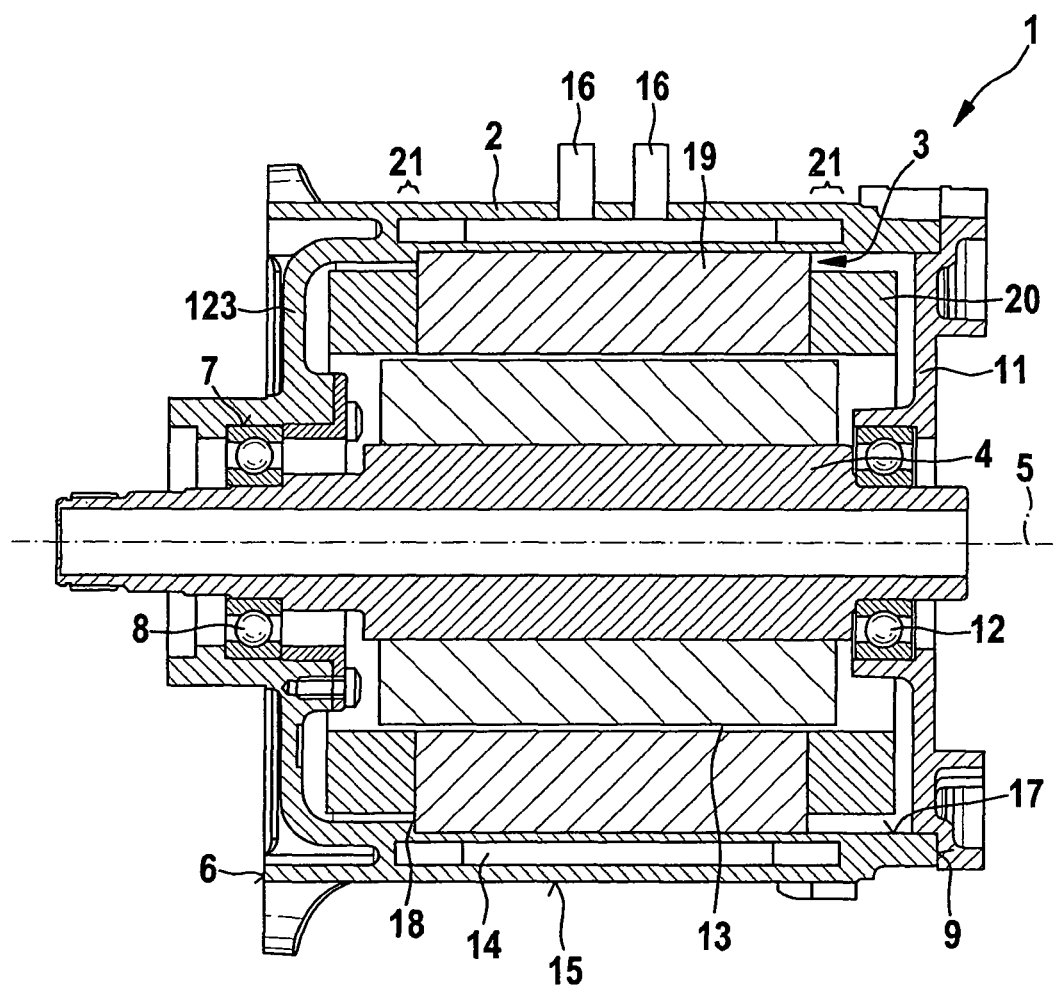
FIG. 1 shows a representation of a sectional drawing of an electric machine manufactured in accordance with the method of the present invention.

The sectional drawing represented in FIG. 1 shows an electric machine 1, which was manufactured according to a method of the present invention. Electric machine 1 is made up of a housing 2, in which a stator 3 is accommodated and in which a rotor 4 is disposed so as to be able to rotate about a rotor axis 5. Stator 3 is made up at least of one stator body 19 and stator windings 20. A bearing support part 123 is formed in one piece on a bearing support side 6 of housing 3, which receives a fixed bearing 8 for supporting rotor 4 in a machined bearing receptacle 7. On an opposite ring side 9 of housing 2, a bearing support 11 is fastened, which receives a floating bearing 12 for supporting rotor 4. Bearing support 11 is fastened on housing 2 for example by a screw connection that is not shown here. Between stator 3 and rotor 4 there is an air gap 13, which must be kept as small as possible for electric machine 1 to achieve an optimal efficiency.

A cooling channel 14 is formed in housing 2, which may have coolant running through it that is fed into cooling channel 14 via two coolant connectors 16 situated on outer circumference 15. A stop 18 is worked out on inner side 17 of housing 2, on which stator abuts with its stator body 19. Stop 18 is manufactured for example by a machining method, in particular by turning, from ring side 9 up to the desired position of stop 18. The position of stop 18 in the housing is produced as a function of the length of the stator and the construction of the stator.

The construction of the stator results from the components of stator 3, it being possible for the stator windings 20 to be formed from distributed windings or individual tooth windings. Distributed windings protrude further from stator body 19 than individual tooth windings. Accordingly, the position of stop 18 must fulfill the following criteria: A first criterion is that cooling channel 14 covers stator body 19 maximally, in particular entirely (stator length), a coverage 21 of stator body 19 having been achieved in the specific embodiment shown. A maximum cooling jacket coverage should be achieved in order to achieve an optimization of the cooling performance and along with it an optimization of the usable power of electric machine 1. As a second criterion, stator windings 20 must not touch housing 2 because an insulation distance must be maintained (stator construction). In this embodiment, stator 3 is shrunk into housing 2, but may alternatively also be pressed in or fastened in other ways so as to be secured against rotating or traveling axially.

An advantageous manufacturing method for producing housing 3 is the lost foam method. For this purpose, a foamed model of the cast part is produced, the so-called foam part. A tool for producing the foam part is filled with plastic beads made of polystyrene, and subsequently high-temperature steam is blown into the plastic beads in order to melt them together. This produces a vaporizable model made of polymer, which after removal from the tool has a form that is essentially identical to the desired final cast product. The model is then coated with a thin, water-soluble dressing, is back-filled with binder-free sand and is cast. The liquid casting material, which may be aluminum or cast steel, vaporizes the foam part and occupies the hollow space in the sand mold.

Figure 2:
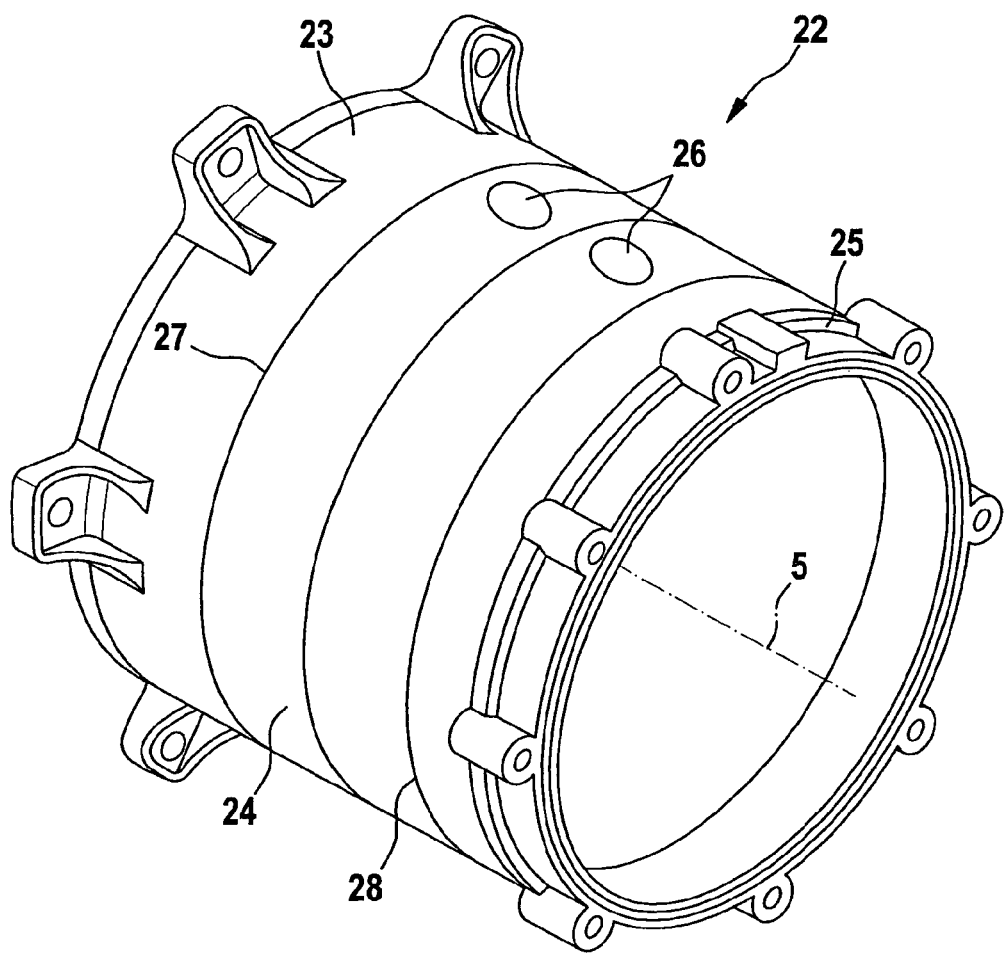
FIG. 2 shows a perspective representation of a housing foam part of a first embodiment as shown in FIG. 1.

FIG. 2 shows a perspective representation of a housing foam part 22 of the first embodiment of the present invention. Housing foam part 22 is formed from three individual foam parts 23, 24, 25, which are joined by a bonding method coaxially to rotor axis 5. The individual foam parts 23, 24, are a bearing support disk 23, a center disk 24 having integrated openings 26, and an annular disk 25. In the bonding method, the individual foam part of bearing support disk 23 is bonded to the individual foam part of center disk 24 at a first bond seam 27. The individual foam part of annular disk 25 is subsequently bonded to center disk 24 at a second bond seam 28. Alternatively, annular disk 25 may also be bonded first to center disk 24, and bearing support disk 23 may be subsequently bonded to center disk 24.

Figure 3:
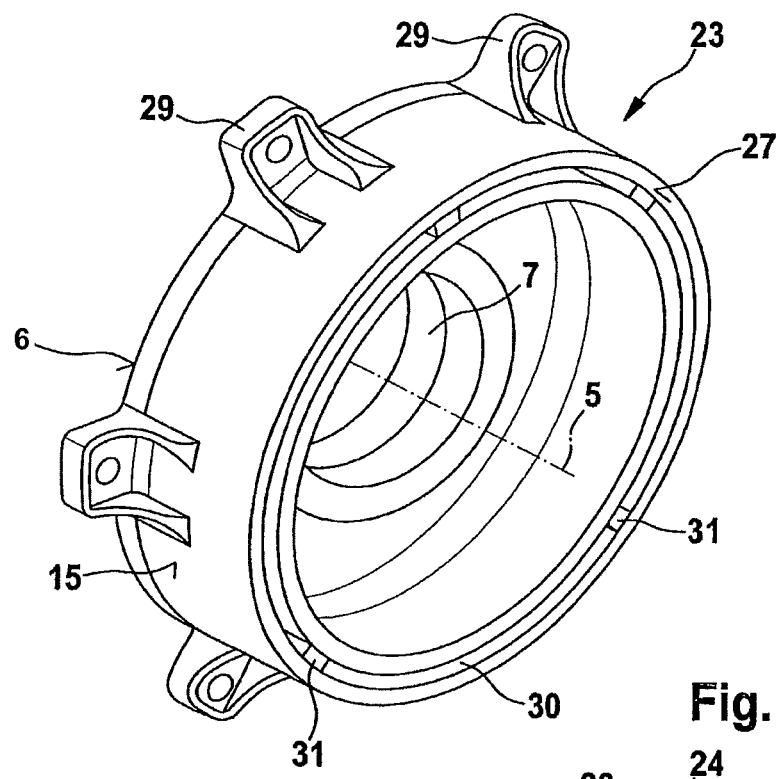
FIG. 3 shows a perspective representation of an individual foam part of a bearing support disk of the first embodiment as shown in FIG. 1.
Figure 4:
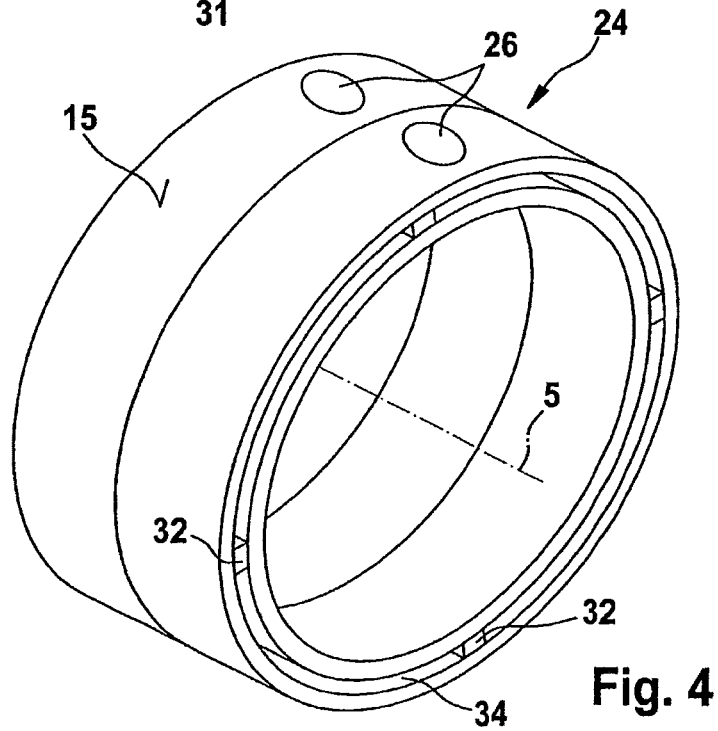
FIG. 4 shows a perspective representation of an individual foam part of a center disk of the first embodiment as shown in FIG. 1.

Individual foam parts 23, 24, 25 are shown in FIGS. 3, 4 and 5 and described in more detail below. FIG. 3 shows a perspective representation of the cup-shaped individual foam part of bearing support disk 23 of the first embodiment. Projections 29 are disposed on bearing support side 6 on outer circumference 15 of bearing support disk 23, which are cast on in one piece in the later lost foam method. Furthermore, a geometry of bearing receptacle 7 is developed on bearing support side 6 in the radial direction inward toward rotor axis 5. A geometry of a cooling channel 30 is developed on the side of bond seam 27 toward center part 24, which has crosspieces 31 in this specific embodiment.

Crosspieces 31 are used to stabilize the individual foam part of bearing support disk 23 and together with additional crosspieces 32 (FIG. 4), 33 (FIG. 5b)) of center disk 24 and ring disk 25 they form a geometry of the finished cooling channel 14 of the housing 2 in a meander form. The coolant is conducted through cooling channel 14 by crosspieces 31, 32, 33. In other specific embodiments of the present invention, crosspieces 31 may be omitted for example such that cooling channel 14 is formed without crosspieces 31. In this case, the three individual foam parts 23, 24, 25 may be mutually aligned in any desired angular position with respect to rotor axis 5, which fulfills the requirements of housing 2, and be bonded together.

FIG. 4 shows a perspective representation of the individual foam part of center disk 24 of the first embodiment. Openings 26 are developed on outer circumference 15 of center disk 24. These are used to connect coolant connectors 16 in the cast part produced later. A geometry of a cooling channel 34 is developed in center disk 24, and center disk 24 has crosspieces 32 in the geometry of cooling channel 34, the function of which was already described. Furthermore, rotor axis 5 is shown.

Figure 5A:
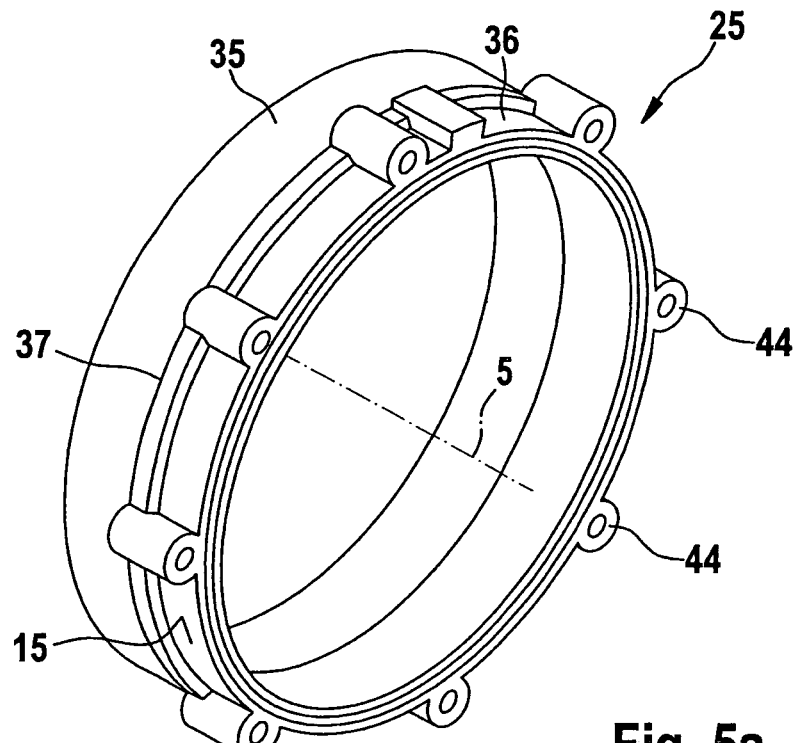
FIG. 5a shows a perspective representation of an individual foam part of an annular disk of the first embodiment as shown in FIG. 1 in a first view.

FIG. 5a) shows a perspective representation of the individual foam part of annular disk 25 of the first embodiment in a first view. The annular disk is divisible into a first and a second annular foam part 35, 36. Geometries for projections 44 are disposed on outer circumference 15 of second annular foam part 36, the function of which will be described later. Annular disk 25 may be manufactured by two different methods. In a first method, first and second annular foam part 35, 36 are manufactured separately, are subsequently joined coaxially with respect to rotor axis 5, and are bonded together in any desired angular position with respect to rotor axis 5 at a bond seam 37. A second method for manufacturing annular disk 25 derives from the description of FIG. 6.

Figure 5B:
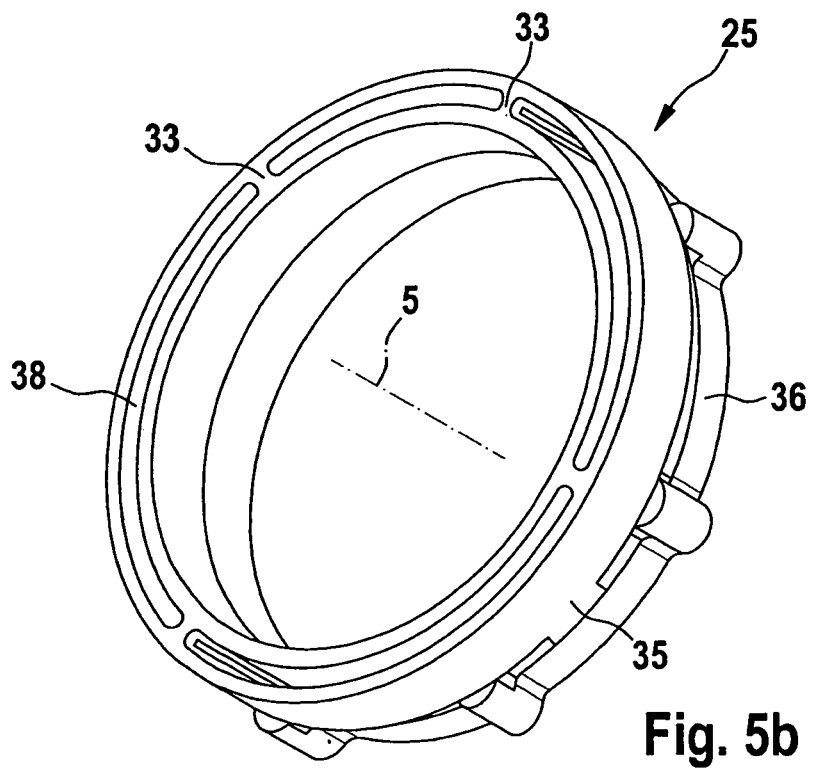
FIG. 5b shows a perspective representation of the individual foam part of the annular disk of the first embodiment as shown in FIG. 1 in another view.

FIG. 5b) shows a perspective representation of annular disk 25 of the first embodiment made up of the two annular foam parts 35, 36 in a top view on first annular foam part 35. A geometry of a cooling channel 38 having crosspieces 33 is developed in first annular foam part 35. Furthermore, rotor axis 5 is shown. The geometry of cooling channel 38 including crosspieces 33 of annular foam part 35 defines at what angular position annular disk 25 is bonded to center disk 24. The second annular foam part 36 is oriented in such a way that the requirements of specified interfaces are fulfilled.

Figure 6:
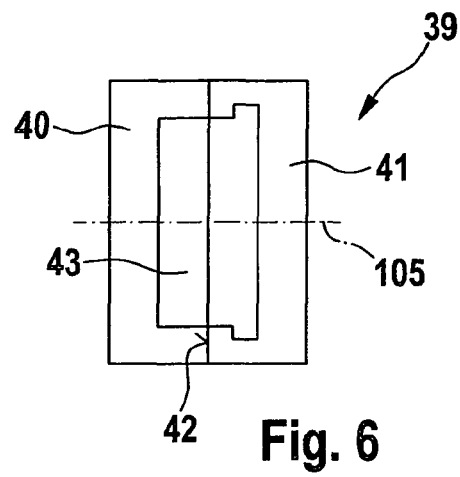
FIG. 6 shows a representation of a sectional drawing of a tool for manufacturing an individual foam part of an annular disk.

FIG. 6 shows a representation of a sectional drawing of a tool 39 for manufacturing the individual foam part of annular disk 25. In this second method for manufacturing the individual foam part of annular disk 25, tool 39 is made up of a first and a second annular foam mold half 40, 41, the two annular foam mold halves 40, 41 being joined or closed on a contact surface 42 coaxially with respect to virtual rotor axis 105. Annular foam mold halves 40, 41, which are also called cavities, may be mutually closed in any angular position with respect to rotor axis 105. The mutual orientation is determined by the requirements of the interfaces. The individual foam part of annular disk 25 is formed in the interior of tool 39, the first annular foam mold half 40 forming the mold of the first annular foam part 35 and the second annular foam mold half 41 forming the mold of the second annular foam part 36.

Figure 7:
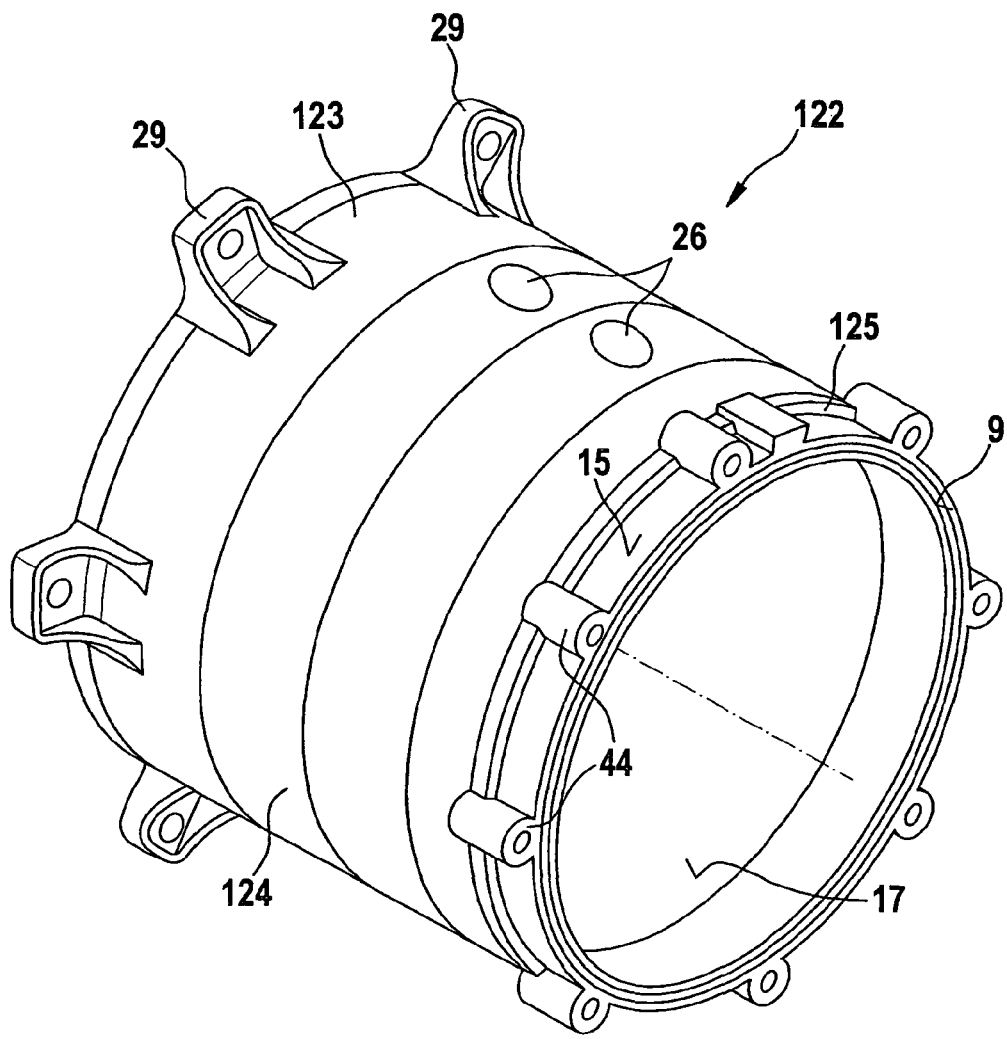
FIG. 7 shows a perspective representation of a housing cast blank of the first embodiment as shown in FIG. 1.

FIG. 7 shows a perspective representation of a housing cast blank 122 of the first embodiment of the present invention. Housing cast blank 122 is produced in one casting from metal by the lost foam method and beginning from ring side 9 may be divided into an annular part 125, a center part 124 and a bearing support part 123. Projections are disposed on outer circumference 15 of annular part 125 on ring side 9, on which, after they have been machined, bearing support 11 of electric machine 1 is fastened. The machining provides for example for drilling through-openings through projections 44 or for threading in order to fasten bearing support 11 by screws on housing 2 for example. Openings 26 are situated on outer circumference 15 of center part 124, which are used for example to insert and/or screw in coolant connectors 16.

Figure 8:
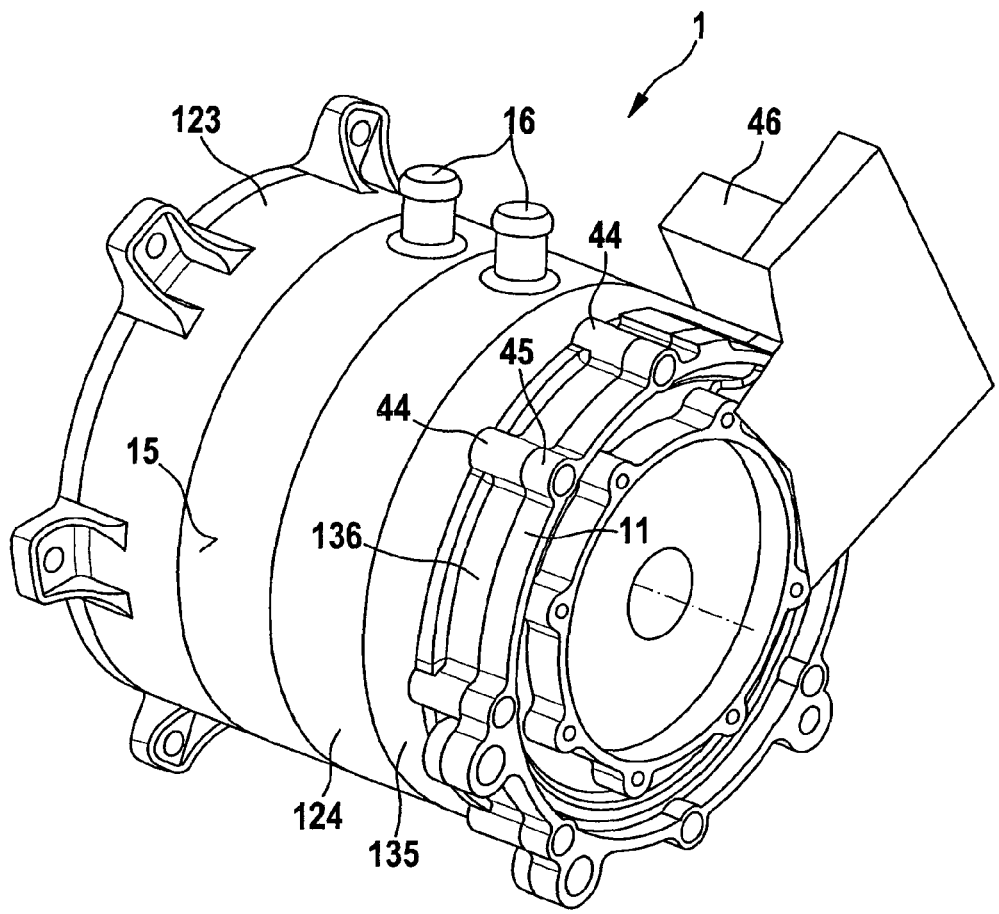
FIG. 8 shows a perspective representation of the electric machine of the first embodiment as shown in FIG. 1.

FIG. 8 shows a perspective representation of an electric machine 1 of the first embodiment manufactured in accordance with the present invention having bearing support 11 screwed on. Housing 2 of electric machine 1 is divisible into bearing support part 123, center part 124, and annular part 125, annular part 125 being divisible into a first and a second annular part 135, 136. Bearing support 11 is fastened to projections 44 of second annular part 136 via screw connections 45, and a connection 46 is situated on bearing support 11. Connection 46 is a predefined interface and is in this specific embodiment a high voltage terminal of electric machine 1. In addition, center part 124 has two coolant connectors 16 on outer circumference 15. The angular position of second annular part 136 with respect to first annular part 135 is determined by the position of connection 46 with respect to coolant connectors 16.

Figure 9:
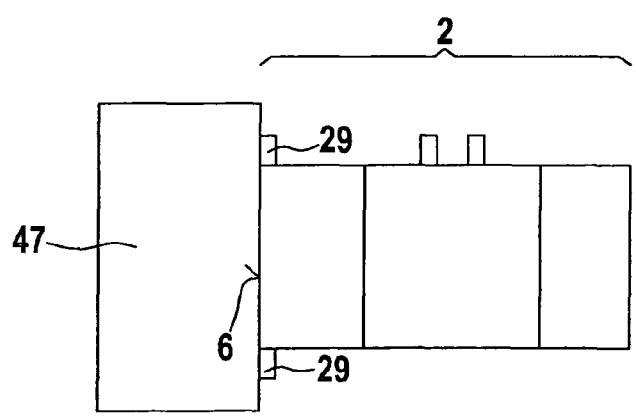
FIG. 9 shows a lateral view of the electric machine of the first embodiment as shown in FIG. 1 including an existing component.

FIG. 9 shows a lateral view of electric machine 1 of the first embodiment on an existing component 47. On bearing support side 6 of housing 2, electric machine 1 is fastened on component 47 via projections 29, in particular by screw connections. The existing component 47 is for example a gear unit in the drive train of a motor vehicle, in particular of a hybrid vehicle or an electric vehicle. Electric machine 1, however, may also be fastened directly to a wheel of the motor vehicle for example, or to other existing components 47, which drive the motor vehicle by electric machine 1 or transmit energy to electric machine 1.

Figure 10B:
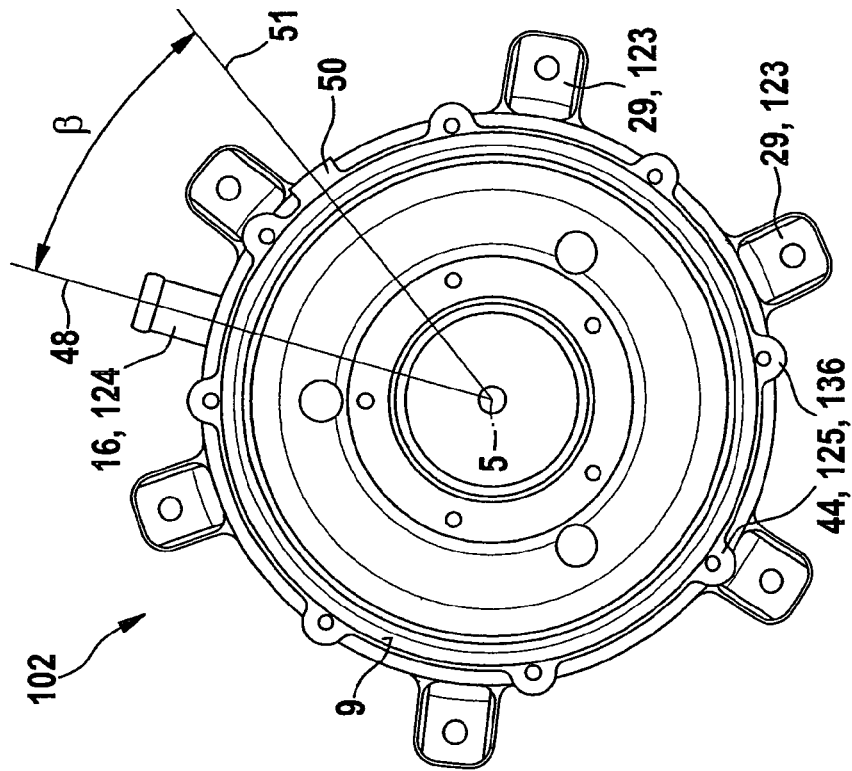
FIG. 10b shows a top view on an end face of a second specific embodiment of the housing.
Figure 10A:
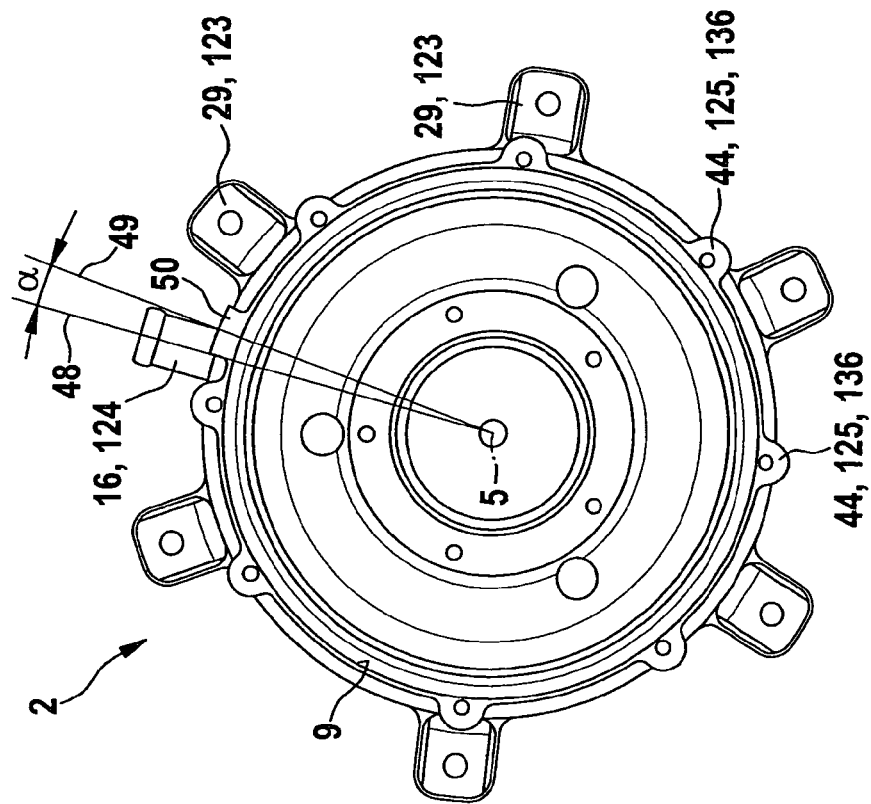
FIG. 10a shows a top view on an end face of the first specific embodiment of the housing as shown in FIG. 1.

FIG. 10a) shows a top view on ring side 9 of the first embodiment of housing 2. The figure shows projections 29 of bearing support part 123, coolant connector 16 of center part 124, and second annular part 136 of annular part 125 having projections 44 for fastening bearing support 11. A first and a second reference line 48, 49 are represented to describe an angle α. First reference line 48 is drawn through rotor axis 5 and coolant connector 16, and second reference line 49 is drawn through rotor axis 5 and a shoulder 50 on second annular part 136. Angle α describes the angular position of second annular part 136 with respect to coolant connector 16 of center part 124 and thus the position of the existing interfaces with respect to each other.

FIG. 10b) shows a top view on ring side 9 of a second embodiment of housing 102. The representation is analogous to FIG. 10a) except that second annular part 136 is situated at a greater angle β with respect to coolant connector 16 than angle α in FIG. 10a). For the representation, a third reference line 51 is drawn through shoulder 50 and rotor axis 5. Compared to housing 2 shown in FIG. 10a), second annular part 136 of housing 102 is cast in this embodiment rotated by angle (β-α).

Figure 11:
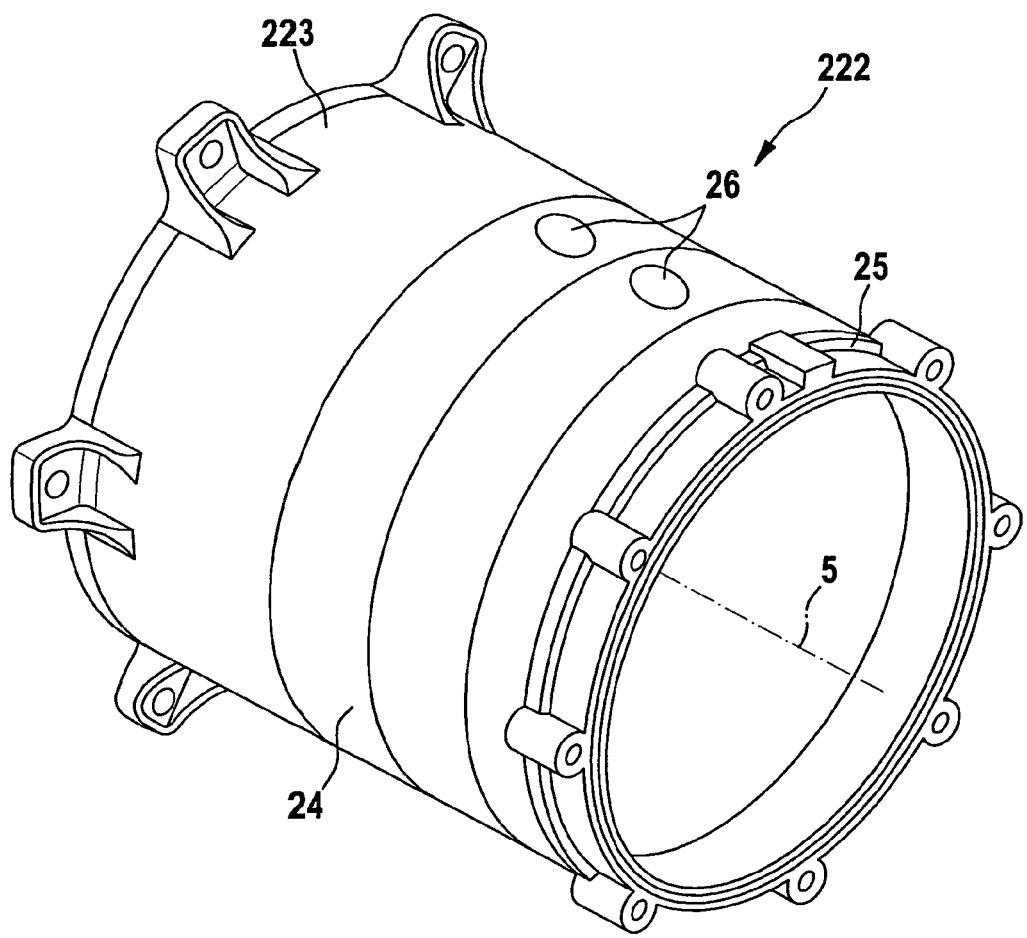
FIG. 11 shows a perspective representation of a housing foam part of a third embodiment having an extended bearing support disk.

FIG. 11 shows a perspective view of a housing foam part 222 of a third embodiment having an extended bearing support disk 223. For manufacturing this extended bearing support disk 223, a tool changed in length is produced for manufacturing the foam part. Housing foam part 222 is manufactured as described in FIG. 2 in that unmodified center disk 24 is bonded to extended bearing support disk 223 coaxially to rotor axis 5, and subsequently annular disk 25 is bonded to center disk 24.

Another possibility of axially lengthening housing foam part 22 and as a result housing 2 is to extend the individual foam parts of annular disk 25 and there specifically first annular foam part 35. Depending on the construction and requirement of electric machine 1 it is useful to extend axially only one individual foam part 23, 25 or both individual foam parts 23, 25. Center disk 24, from which center part 124 is removed after casting, is kept constant in its axial extension.

Defining housing foam part 22 in terms of an axially constant center disk 24, a variable bearing support disk 23, and a variable annular disk 25 makes it additionally possible to vary the diameters of the two individual foam molds 23, 25 relatively independently of the diameter of center disk 24. A free design is thereby achieved with respect to component 47 on the interface on bearing support side 6 and/or a flexible connection to ring side 9 of housing 2, and thus the connection of bearing support 11.

The construction of housing 2 by housing foam mold 22 and the three individual foam parts 23, 24, 25 must be chosen in such a way that the variety of the different individual foam parts 23, 24, 25 is limited and a coverage of most of the different specified interfaces and stators 3 by respectively one ready-made foam tool for producing foam parts 23, 24, 25 is achieved.

It should be noted that the foam pieces made of plastic are called foam parts. The tools for manufacturing the foam parts are called foam tools.

What is claimed is:

1. A method for manufacturing an electric machine, the method comprising:
 making a housing for the electric machine by performing the following:
  making a housing foam part from at least three individual foam parts, the individual foam parts including: (i) a center disk, which has an essentially hollow-cylindrical design and forms an intermediate piece of the housing foam part, (ii) an annular disk, which has an essentially hollow-cylindrical design and forms another intermediate piece of the housing foam part, and (iii) a bearing support disk, which has an essentially cup-shaped design and forms an end of the housing foam part; and
  making a housing cast blank using the housing foam part by a lost foam casting process, the housing cast blank forming the housing;
 wherein the electric machine includes the housing, a stator accommodated in the housing, which is formed at least from a stator body and stator windings, a rotor, which is supported in the housing so as to be able to rotate about a rotor axis, and a bearing support fastened on the housing.

2. The method of claim 1, wherein the individual foam parts are connected to one another by a bonding process so that the individual foam parts are disposed coaxially with respect to rotor axis, wherein in at least one individual foam part, base geometries of cooling channels are developed such that the developed base geometries of the cooling channels in the housing foam part form a continuous base geometry of a cooling channel of the housing, and wherein the individual foam parts are joined to one another so that the base geometries of the cooling channels developed in the individual foam part form a continuous base geometry of the cooling channel in the housing foam part.

3. The method of claim 1, wherein the housing foam part is variable in its extension in the axial direction in that at least one of the following is satisfied: (i) the individual foam part of the annular disk is modified in its axial extension, and (ii) the individual foam part of the bearing support disk is modified in its axial extension.

4. The method of claim 1, wherein the individual foam part of the annular disk is formed from one of: (i) a first and a second annular foam part and both annular foam parts are joined coaxially with respect to the rotor axis, these being mutually alignable in a multitude of angular positions with respect to rotor axis, and (ii) one individual foam part, the individual foam part being manufactured by a tool from two annular foam mold halves, which are joined coaxially with respect to rotor axis, and which are mutually alignable in rotatable fashion in a multitude of angular positions with respect to the rotor axis.

5. The method of claim 4, wherein a position of at least one of (i) the first annular foam part and the second annular foam part, and (ii) the first annular foam part half and the second annular foam part half with respect to each other is predefined by an arrangement of coolant connectors disposed on the housing, and a terminal disposed on the bearing support.

6. The method of claim 1, wherein the housing cast blank is machined on the inside, and wherein in the process a stop is developed on which the stator body abuts after mounting the stator in the housing.

* * * * *